Dec. 16, 1924.
J. W. MILNOR
1,519,870
BALANCING OCEAN CABLE SYSTEM
Filed Jan. 28, 1920
*Fig. 1.*
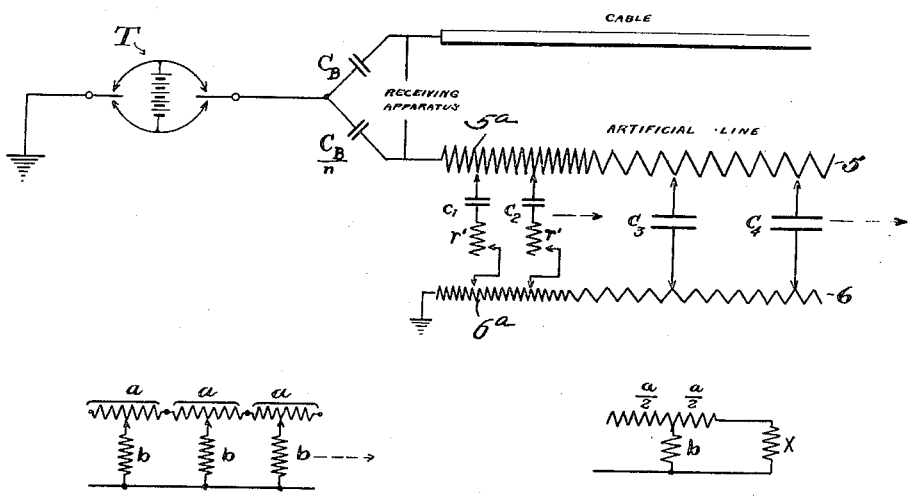
*Fig. 2.*
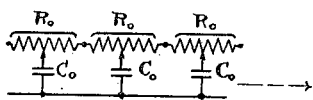
*Fig. 3.*
*Fig. 4.*
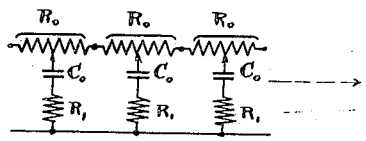
*Fig. 5.*
Witness
Inventor
J. W. Milnor
By Eugene C. Brown
Attorney Patented Dec. 16, 1924.

1,519,870

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

BALANCING OCEAN-CABLE SYSTEM

Application filed January 28, 1920. Serial No. 354,549.

*To all whom it may concern:*

Be it known that I, JOSEPH W. MILNOR, a citizen of the United States, residing at New York, in the county of New York and State of New York, have invented certain new and useful Improvements in Balancing Ocean-Cable Systems, of which the following is a specification.

This invention relates to improvements in electrical communication and more particularly to a method of arranging the elements of the "artificial" or "false" line to effectively and accurately balance the capacity, inductance and resistance of the main line.

In various systems of electrical communication, including telephony, land line telegraphy and ocean cable telegraphy, it is customary to arrange terminal apparatus in such a manner that signals passing in a given direction over the line may be transmitted without interfering with the transmission and reception of signals passing in the opposite direction over the line. A system arranged in this way is said to be "duplexed". In order to duplex a line efficiently, it is necessary that an artificial line be provided which should match the electrical characteristics of the main line as nearly as practicable.

The invention herein disclosed is described with particular reference to its application in ocean cable telegraphy, in which field the greatest difficulty is encountered in providing an accurate artificial line. It should be noted, however, that the principles involved are equally applicable to land line telegraphy and to telephony.

It has in the past been customary to make up artificial lines for use in ocean cable telegraphy in the form of a number of boxes, each box containing condensers having capacity of perhaps 20 microfarads, together with resistance of between 100 and 600 ohms. In order to distribute the capacity or condenser effect uniformly over the resistance of the artificial line, the resistance would in some instances be constituted of continuous strips of tin foil, cut in ribbons of proper width, which are placed in proximity to, but separated from other strips of tin foil, the latter being connected to earth at various points at will, to thereby add capacity to the strip. In other instances, artificial line boxes would contain a large number of small resistances with small condensers connected between them, in order to provide a smooth distribution of resistance and capacity. In some of the more modern boxes, small self-inductance coils are provided in addition to the capacity and resistance.

While an artificial cable or line made up as above described might meet the calculated constants of the main cable, yet in effect it would provide only an approximate balance and it was always necessary to make a final adjustment of the balance in the various ways. Obviously, boxes constructed as described above could not in themselves be readily adjusted. Various external devices were employed to make the final adjustment. One of the block condensers is usually made adjustable for the purpose of changing the capacity effect, but it was usually necessary to disconnect condensers at various points and to strap out or short circuit resistances here and there along the artificial line or cable, in order to obtain the final balance; and when it was desired to secure a very accurate balance for magnifier or amplifier working, it was usually necessary to add small adjustable external resistances at various points along the line.

One of the purposes of my invention is to provide an artificial line which is adequately and conveniently adjustable throughout its extent, and which will be least subject to trouble due to possible contact resistance. A further object is to conveniently balance the inductance of the line as well as its capacity and resistance.

This invention will be understood from the following description in connection with the accompanying drawings, in which Figure 1 is a diagrammatic illustration of a cable sending station provided with an artificial cable or line embodying my invention; and Figs. 2 to 5 inclusive are diagrams illustrative of the principles involved.

I have shown in conventional form, the ends of the main cable and artificial line connected in the usual manner for duplex working to the arms of a Wheatstone bridge provided with condensers $C_B$ and $C_B/n$, the bridge being connected to the usual transmitter T, for alternately connecting the positive or negative side of the battery in accordance with the code signals transmitted.

The whole of the resistance of the artificial line is divided into small steps and in order to facilitate the adjustments and to reduce the number of steps necessary, I divide the resistance into two main portions or branches 5, 6, one section being on the line side and the other on the ground side. In each branch the size of the steps is smaller at the connected end, shown at the left, and larger at the opposite end. Again, I prefer to make the resistance of the steps at the head or connected end 5ª of the line side resistance considerably larger than those at 6ª in the branch on the ground side. Thus it is convenient to make the steps at 5ª about 2 ohms and those at 6ª about .05 ohms each.

The capacity of the artificial line is provided by a number of condensers $C_1$, $C_2$, $C_3$, $C_4$, etc. in fairly large units. The condensers are connected by means of flexible cord conductors between points in the opposite resistances, so that each side of the condenser may be adjusted to different contact points along the resistances, as indicated. An adjustable resistance $r'$ is preferably inserted in series with some or all of the condensers for reasons hereinafter explained.

As I have previously pointed out, it has heretofore been the practice to distribute the capacity along the resistance as uniformly as possible which it was supposed would most nearly approximate the actual conditions of the main cable. It might be supposed, therefore, that my arrangement of what might be termed a series of lumped resistances and capacity would not reproduce the characteristics of the cable with sufficient accuracy to obtain a proper balance. I have discovered, however, that the lack of smooth distribution, or the lumped resistances and capacity, result in a decided advantage and assist in correcting for the self-inductance of the cable. That this is true will be apparent from the equations given below.

The impedance of a long cable in ohms is—

$$Z_0 = \sqrt{\frac{R+j\omega L}{j\omega C}} = \sqrt{\frac{R}{j\omega C}+\frac{L}{C}} \quad (1)$$

and the impedance of the artificial line will be $$nZ_0 = \sqrt{\frac{Rn^2}{j\omega C}+\frac{Ln^2}{C}} \text{ ohms}, \quad (2)$$

in which $R$ = the ohmic resistance of the cable per mile,
$C$ = the capacity in farads of the cable per mile,
$L$ = inductance in henrys of the cable per mile,
$n$ = ratio of the block condensers,
$\omega = 2P \times$ frequency,
$j = \sqrt{-1}$.

The impedance of a long series of network, as illustrated in Fig. 2, may be calculated as follows:

Since the network consists of a large number of similar units, it is evident that if it is broken between any two units its impedance (looking toward the right), will be substantially the same. Let this impedance equal $x$. Now refer to Fig. 3, which shows one unit of the network, with the remainder of the network replaced by an impedance $x$. It is evident that the impedance of the circuit in Fig. 3 is equal to—

$$\frac{a}{2}+\frac{b\left(\frac{a}{2}+x\right)}{b+\frac{a}{2}+x} \quad (3)$$

But this impedance itself must equal $x$. Placing Equation (3) equal to $x$, and solving for $x$, we have $$x=\sqrt{ab+\frac{a^2}{4}} \quad (4)$$

It should be noted that $a$, $b$, and $x$, may each represent simple resistances or they may each represent impedance consisting of resistances, coils or condensers, separate or in combination.

Introducing condensers into the network, as shown in Fig. 4, and assuming that $a = R_0$, and $b = \frac{1}{j\omega C_0}$, then Equation (4) becomes $$x=\sqrt{\frac{R_0}{j\omega C_0}+\frac{R_0^2}{4}} \quad (5)$$

A balance is, therefore, obtained, (see Equation 2) if $$\frac{R_0^2}{4}=\frac{Ln^2}{C} \quad (6)$$

or $$R_0 = 2n\sqrt{\frac{L}{C}} \quad (7)$$

also if $$\frac{R_0}{C_0}=\frac{Rn^2}{C} \quad (8)$$

In the above equations,
$R_0$ = resistance of one unit of artificial line,
$C_0$ = capacity of one unit of artificial line.
The meaning of these quantities is shown in Fig. 4.

The above analysis shows that if Equations 7 and 8 are fulfilled, the resistance, capacity and inductance of the main cable are completely balanced for all frequencies. In practice for ocean cable working, it is sufficient to have a balance correct for frequencies from zero to about 20 cycles per second. For land line telegraphy, it is necessary to have a balance correct for frequencies from zero to about 150 cycles per second. For telephony, it is necessary to have a balance correct for frequencies from about 200 to 3000 cycles per second.

The arrangement shown in Fig. 4, upon which Equations (7) and (8) are based, might be found to be too inflexible, and in order to avoid this inflexibility I have found that it is preferable to insert a resistance $R_1$ in series with each condenser in the manner illustrated in Fig. 5. The resistance $R_1$ is primarily a correction for the self-inductance of the main cable. Referring to Fig. 5, if $a = R_0$ and $b = R_1 + \frac{1}{j\omega C_0}$, then $$\text{impedance} = \sqrt{\frac{R_0}{j\omega C_0} + \frac{R_0^2}{4} + R_1 R_0} \quad (9)$$

A balance correct for all frequencies is, therefore, obtained (see Equation 2), if $$\frac{R_0^2}{4} + R_1 R_0 = \frac{Ln^2}{C} \quad (10)$$

or $$R_1 = \frac{Ln^2}{CR_0} - \frac{R_0}{4} \quad (11)$$

also if $$\frac{R_0}{C_0} = \frac{Rn^2}{C} \quad (12)$$

In other words, the cable is correctly balanced for all frequencies if Equations (11) and (12) are fulfilled.

It has been assumed that the artificial line is made up of an infinite number of units. In practice, with a finite number of units, these equations are approximately correct only. They are, however, sufficiently exact for all practical purposes if the number of units is large.

It is immaterial whether each unit of the artificial line is alike, or whether the units are different. Referring to Fig. 3, the impedance $x$ may be made up in any way desired, provided that its value is correct. Equation 4 is true irrespective of whether the adjacent units are similar or dissimilar to the particular unit under consideration. It is only necessary that the resistance and capacity of each unit taken alone shall satisfy Equations 7 and 8; or that the resistance and capacity of the unit shall satisfy Equations 11 and 12. In practice it is convenient to make use of relatively small units of resistance and capacity near the connected end of the artificial line, with relatively large units of resistance and capacity near the opposite end of the line.

If the main cable is made up of sections having slightly different electrical characteristics, reflections will be brought in from points where the characteristics change. These effects, however, are small and it has been found possible to correct for them by making a slight change in the positions of a few of the condensers.

Ordinarily, an ocean cable has a slight amount of leakage. This leakage, if small, may be balanced by changing the positions of a few of the condensers. If the leakage is large, it may be approximately balanced by adding high resistance leaks at proper points in the artificial line.

For the purpose of eliminating the extraneous disturbances which would interefere if the ground connection were made at the shore, it is customary to ground out at sea a distance of from one to ten miles by means of an extra conductor carried by the cable which is then grounded on the cable sheath and is termed a "sea earth." While the effect of the "sea earth" must be taken into account in making the artificial line balance, this is very slight and can be corrected simply by making a suitable change in the position of the first few condensers along the artificial line.

By placing the adjustable connections of the condensers in shunt between the two portions or branches 5, 6, of the resistance as shown, the possibility of trouble due to contact resistance is practically eliminated. Thus, if one of the contacts should not be secure, the contact will add resistance to the circuit through one condenser only, and the current through the other condensers is not affected. On the other hand, if adjustments had been made by including adjustable resistances in series in the line, the line would have been much more susceptible to trouble due to contact resistance in the adjustment. This is obviously true, for the reason that any contact resistance due to an insecure contact would affect the current flowing into all condensers of the artificial line.

The object of placing the resistance of the artificial line in two branches, 5ª and 6ª, Figure 1, is to decrease the total number of steps of resistance necessary. Thus, if the line had been arranged in the general form shown in Figures 4 or 5, it would be necessary, in practise, to provide over 100,000 steps of resistance to adequately balance an ocean cable.

By arranging the line in the general form illustrated in Figure 1, with one branch made up of fairly large resistance steps, while the other branches are made up of relatively small resistance steps, it is sufficient to provide a few hundred steps of resistance in each branch of the artificial line, and yet adequately balance an ocean cable.

The advantages of my method of balancing the constants of a cable and of the manner of adjusting the artificial line will be appreciated from the foregoing description. The lumped resistances and capacity facilitate the correction for the self-inductance of the cable, and the arrangement of the divided resistance, with the flexible cord connections for both sides of the condensers enables one to obtain a balance much more quickly than heretofore, while the trouble due to contact resistance has been practically eliminated.

I claim:—

1. An artificial cable or line for balancing the constants of an ocean cable, comprising separated parallel resistance sections adapted to be connected respectively to the cable and to ground, and condensers provided with adjustable means for connecting them between different points along said separated resistance sections.

2. An artificial cable or line for balancing the constants of an ocean cable, comprising separated parallel resistance sections adapted to be connected respectively to the cable and to ground, and condensers having flexible conductors connected to opposite sides thereof for adjustable connection with different points along said separated resistance sections.

3. An artificial cable as set forth in claim 1, and resistances inserted in said adjustable condenser connections.

4. An artificial cable or line for balancing the constants of an ocean cable comprising separated resistance sections adapted to be connected respectively to the cable and to ground, said resistance sections being subdivided into a series of steps, the resistance of the steps of the section on the cable side being larger than the corresponding steps of the section on the ground side, and condensers having flexible conductors connected to opposite sides thereof for adjustably connecting the condensers between different points along said separated resistance sections.

5. An artificial cable or line as set forth in claim 2, and adjustable resistances inserted in said condenser connections.

6. An artificial cable or line containing resistance and capacity only, which balances the constants of an actual line containing resistance, capacity and inductance over a wide range of frequencies compared with the range of frequencies at present used in telegraphy.

7. In combination with a cable, an artificial line connected between one end of the cable and ground, said artificial line containing lumped resistance and capacity, with resistances and condensers forming units connected between the cable and ground, the resistances and condensers of each unit being adjusted to satisfy the equations $$R_0 = 2n\sqrt{L/C}, \text{ and } R_0/C_0 = Rn^2/C.$$

8. In combination with a cable, an artificial line connected between one end of the cable and ground, said artificial line containing lumped resistance and capacity, with additional units comprising resistance in series with a condenser, the units being connected in parallel between the cable and ground, and with resistance and capacity values of each unit adjusted to statisfy the equations $$R_1 = Ln^2/CR_0 - R_0/4, \text{ and } R_0/C_0 = Rn^2/C.$$

9. An artificial line containing lumped resistance and capacity, with resistances and condensers forming a series of connected units, the resistance and condenser or each unit being adjusted to satisfy the equations $$R_0 = 2n\sqrt{L/C}, \text{ and } R_0/C_0 = Rn^2/C.$$

10. An artificial line containing lumped resistance and capacity, with resistances and condensers forming a series of connected units substantially as described, the resistance and condenser of each unit being adjusted to satisfy the equations $$R_0 = 2n\sqrt{L/C}, \text{ and } R_0/C_0 = Rn^2/C.$$

11. An artificial line containing lumped resistance and capacity, with resistances and condensers forming a series of connected units, the resistance and condenser of each unit being adjusted to balance the constants of an actual line containing resistance, capacity, and inductance, in accordance with the equations $$R_0 = 2n\sqrt{L/C}, \text{ and } R_0/C_0 = Rn^2/C.$$

12. An artificial line containing lumped resistance and capacity, with resistances and condensers forming a series of connected units substantially as described, the resistance and condenser of each unit being adjusted to balance the constants of an actual line containing resistance, capacity, and inductance, in accordance with the equations $$R_0 = 2n\sqrt{L/C}, \text{ and } R_0/C_0 = Rn^2/C.$$

13. An artificial line containing lumped resistance and capacity, with resistances and condensers forming a series of connected units, the resistance and condenser of each unit being adjusted to satisfy the equations $$R_1 = Ln^2/CR_0 - R_0/4, \text{ and } R_0/C_0 = Rn^2/C.$$

14. An artificial line containing lumped resistance and capacity, with resistances and condensers forming a series of connected units substantially as described, the resistance and condenser of each unit being adjusted to satisfy the equations $$R_1 = Ln^2/CR_0 - R_0/4, \text{ and } R_0/C_0 = Rn^2/C.$$

15. An artificial line containing lumped resistance and capacity, with resistances and condensers forming a series of connected units, the resistance and condenser of each unit being adjusted to balance the constants of an actual line containing resistance, capacity, and inductance, in accordance with the equations $R_1 = Ln^2/CR_0 - R_0/4$, and $R_0/C_0 = Rn^2/C$.

16. An artificial line containing lumped resistance and capacity, with resistances and condensers forming a series of connected units substantially as described, the resistance and condenser of each unit being adjusted to balance the constants of an actual line containing resistance, capacity, and inductance, in accordance with the equations $R_1 = Ln^2/CR_0 - R_0/4$, and $R_0/C_0 = Rn^2/C$.

In testimony whereof I affix my signature.

JOSEPH W. MILNOR.

Witnesses:
N. F. SAUER,
MARTHA EHLER.